(12) United States Patent
Hietala

(10) Patent No.: US 7,628,934 B2
(45) Date of Patent: Dec. 8, 2009

(54) DEICING COMPOSITION AND USE THEREOF

(75) Inventor: Jukka Hietala, Porvoo (FI)

(73) Assignee: Perstorp Specialty Chemicals, AB, Perstorp (SE)

( * ) Notice: Subject to any disclaimer, the term of this patent is extended or adjusted under 35 U.S.C. 154(b) by 0 days.

(21) Appl. No.: 11/884,236

(22) PCT Filed: Feb. 6, 2006

(86) PCT No.: PCT/SE2006/000162

§ 371 (c)(1),
(2), (4) Date: Oct. 23, 2008

(87) PCT Pub. No.: WO2006/085814

PCT Pub. Date: Aug. 17, 2006

(65) Prior Publication Data

US 2009/0039310 A1     Feb. 12, 2009

(30) Foreign Application Priority Data

Feb. 11, 2005     (SE) .................... 0500327

(51) Int. Cl.
*C09K 3/18*     (2006.01)
(52) U.S. Cl. .......................... 252/70; 106/13
(58) Field of Classification Search ............ 106/13; 252/70
See application file for complete search history.

(56) References Cited

U.S. PATENT DOCUMENTS

| 4,803,007 | A | * | 2/1989 | Garber | 252/70 |
| 5,064,551 | A | * | 11/1991 | Smith | 252/70 |
| 5,127,954 | A | * | 7/1992 | Johnston et al. | 106/644 |
| 5,350,533 | A | * | 9/1994 | Hubred et al. | 252/70 |
| 5,435,930 | A | * | 7/1995 | Chan et al. | 508/145 |
| 6,059,989 | A | | 5/2000 | Stankowiak et al. | |
| 6,059,996 | A | * | 5/2000 | Minks et al. | 252/395 |
| 6,673,261 | B1 | | 1/2004 | Gurkaynak et al. | |
| 6,723,254 | B1 | | 4/2004 | Starzmann | |
| 6,872,327 | B2 | * | 3/2005 | Dietl | 252/70 |
| 2003/0015685 | A1 | | 1/2003 | Sapienza et al. | |
| 2004/0091408 | A1 | * | 5/2004 | Hjornevik et al. | 423/179 |
| 2006/0163528 | A1 | * | 7/2006 | Wenderoth et al. | 252/73 |
| 2009/0001313 | A1 | * | 1/2009 | Lievens et al. | 252/75 |

FOREIGN PATENT DOCUMENTS

| DE | 4034211 | 5/1991 |
| EP | 494506 A1 * | 7/1992 |
| WO | 2005023957 | 3/2005 |

OTHER PUBLICATIONS

Translation of German Patent Specification No. DE4034217A (May 29, 1991).*

* cited by examiner

*Primary Examiner*—Anthony J Green
(74) *Attorney, Agent, or Firm*—Novak Druce & Quigg, LLP

(57) ABSTRACT

Disclosed is a novel deicing composition having improved corrosion inhibition and being obtained by mixing 89-99.98% by weight of an alkali metal formate 0.01-6% by weight of an alkali metal silicate and 0.01-5% by weight of a $C_4$-$C_{19}$ alkyl carboxylic acid, said weight percentages being calculated on dry substances.

24 Claims, No Drawings

DEICING COMPOSITION AND USE THEREOF

The present invention relates to a composition for deicing and/or anti-icing, which composition comprises one or more alkali metal formates as main constituent. In a further aspect, the invention relates the use of said composition in deicing and/or anti-icing of snow and/or ice on primarily traffic areas, such as streets, roads and airfield runways.

Removal (deicing) and prevention (anti-icing) of frost, ice or snow accumulation on for instance for air traffic critical areas, such as airfield runways, are essential for a safe air traffic. Snow and ice on streets, roads, cycleways, footpaths, bridges, backyards, parking areas, sportsgrounds and other trafficked areas lead to a substantial impairment in personal, traffic and transport safety. It has therefore long been known to apply to said areas a composition for melting and/or thawing of snow and/or ice (compositions for melting and/or thawing of snow and/or ice are hereinafter called deicing compositions). The materials from which said areas are made, for instance concrete, stone, bitumen and metals, must not be damaged or otherwise destroyed by a deicing composition. It is also essential to rule out corrosive actions on metals, especially light metals used in for instance aircrafts. Furthermore, a deicing composition may enter the wastewater and biodegradability is thus a further requirement. It is also essential that very rapid thawing is achieved.

In order to remove snow and ice both solid and liquid deicing compositions are used. Solids form brine which penetrates first to the ground and moves then outward melting and undercutting snow and ice. Known and commonly used deicers in said areas include sodium formate, potassium formate, sodium acetate, potassium acetate, magnesium acetate, urea, ethylene glycol and propylene glycol. Urea is not recommended anymore because it degrades to ammonia, which has undesired environmental effects, and because urea looses its ability to melt and/or thaw snow and ice at temperatures below −7° C. Sodium formate works efficiently at low temperatures and is regarded to have low or insignificant environmental side effects, but is corrosive and corrosion inhibitors must be added to deicing compositions comprising sodium formate.

A critical test for air traffic related deicing compositions is the immersion corrosion test disclosed in ASTM F 483-98, AMS 1431B and AMS 1435A, stating that panels of dichromated magnesium alloy AZ31B-H26 must tolerate 5% by weight as well as 15% by weight of an aqueous deicing composition, or a liquid deicing composition in undiluted form, at 38° C. for 24 hours with a weight change of said panels being less than 0.2 mg/cm$^2$.

Many attempts have been made to solve the problem with corrosion by the use of inhibitors. EP 0 375 214 discloses a liquid deicing composition consisting of 45-60% by weight of an alkali metal acetate and/or alkali metal formate, 0.1-0.4% by weight of an alkali metal phosphate and 0.2-0.6% by weight of an alkali metal nitrite. The inhibitor effect of alkali metal phosphate and alkali metal nitrite leaves much to be desired, especially with regard to magnesium. A further disadvantage is the nitrite content. DE 40 34 217 teaches a liquid or solid deicing composition based on water soluble alkali metal salts of formic and/or acetic acid with a corrosion inhibitor system consisting of water soluble polycarboxylic acids and water soluble alkali silicates and/or carbonates. The deicing composition is said to attack neither constructions of concrete, bitumen or stone, nor metallic materials such as iron, copper, aluminium or zinc. U.S. Pat. No. 4,803,007 describes a deicing composition based on sodium chloride and wherein a mixture of a divalent metal salt and an alkali metal polyphosphate is employed as corrosion inhibitor. Divalent metals mentioned include calcium, magnesium and barium with borates, metasilicates and sulphates as counter ions. This inhibitor combination acts in particular to counter corrosion to ferrous metals, but less so with respect to the corrosion of light metals, such as magnesium. U.S. Pat. No. 6,059,989 teaches a deicing composition consisting essentially of 87-99.45% by weight of an alkali metal acetate and/or formate, 0.5-10% by weight of an alkali metal silicate and 0.05-3% by weight of an alkali metal phosphate as corrosion inhibitor. The composition is claimed to ensure short thaw time and corrosion protection, especially with regard to magnesium. DE 4 034 217 provides a deicing composition comprising an alkali or ammonium format or acetate, a hydroxyl substituted polycarboxylic acid, an alkali or ammonium silicate or carbonate and a triazole or thiazole as corrosion inhibitor. WO 03/006571 disclose a corrosion inhibitor for use in deicing compositions, which corrosion inhibitor comprises a di or polyhydric compound, a $C_5$-$C_{16}$ aliphatic mono or dibasic acid and optionally a hydrocarbonyl triazol in a ratio polyhydric compound to aliphatic acid of between approx. 10:1 and 1:1.

It is, furthermore, known to use alkali metal metasilicates, such as sodium metasilicate ($Na_2SiO_3$), to increase the pH in areas wherein a test metal corrodes only slowly and to give a protective silicate layer. Sodium metasilicate is a well known inhibitor frequently disclosed in the literature. Alkali metal metasilicates do, however, not give enough protection towards corrosion of magnesium in formate solutions, why additional inhibitor(s), such as the frequently used alkali metal phosphates and carboxylates, must be added.

The present invention quite surprisingly disclose a novel deicing composition exhibiting improved corrosion inhibition. The deicing composition comprises an alkali metal formate, an alkali metal silicate and a $C_4$-$C_{19}$, such as $C_6$-$C_{12}$, alkyl carboxylic acid. The amounts of said components, with or without additional components, can be varied within wide limits but are preferably 89-99.98% by weight of said alkali metal formate, 0.01-6% by weight of said alkali metal silicate and 0.01-5% by weight of said $C_4$-$C_{19}$ alkyl carboxylic acid. The deicing composition of the present invention is in preferred embodiments obtained by mixing 98-99.98%, such as 99-99.98% or 99.4-99.94%, by weight of said alkali metal formate, 0.01-1%, such as 0.05-0.5%, by weight of said alkali metal silicate and 0.01-1%, such as 0.01-0.5% or 0.01-0.1%, by weight of said alkyl carboxylic acid. Said weight percentages are calculated on dry substances.

The deicing composition of the present invention may, furthermore, additionally comprise an alkali metal hydroxide, alkoxide or carbonate, such as potassium or sodium hydroxide, added in for instance a to said alkyl carboxylic acid equivalent amount and/or an alkali metal phosphate, such as sodium or potassium phosphate, added in an amount of for instance 0.01-1% by weight, calculated on said alkali metal formate.

Said alkali metal formate is in especially preferred embodiments potassium or sodium formate and said alkali metal silicate is preferably a metasilicate, such as potassium or sodium metasilicate.

The most preferred alkyl carboxylic acids are suitably exemplified by valeric acid, capric acid, caprylic acid caproic acid, decanoic acid, dodecanoic acid, hexanoic acid, 2-ethyl hexanoic acid and octanoic acid.

The deicing composition of the present invention is advantageously used as an aqueous solution comprising for instance 5-60%, such as 10-50%, 15-45% or 20-40%, by weight of said deicing composition.

In a further aspect, the present invention refers to the use of a deicing composition as disclosed above in deicing and/or anti-icing of for instance airfields including airfield runways and taxiways, streets, roads, cycleways, footpaths, bridges, backyards, parking areas and sportsgrounds and other trafficked areas in need of deicing and/or anti-icing.

The deicing composition of the present invention is particularly suitable for air traffic areas, such as runways (take off and landing), taxiways, parking areas, bus routes and the like and exhibits improved corrosion inhibition, even at higher concentrations, over prior art deicing compositions comprising an alkali metal formate as main constituent.

Without further elaboration, it is believed that one skilled in the art can, using the preceding description, utilise the present invention to its fullest extent. The following preferred specific embodiments are, therefore, to be construed as merely illustrative and not limitative of the remainder of the disclosure in any way whatsoever. In the following Examples 1-3 are comparative prior art examples outside the scope of the present invention and Examples 4-11 show embodiments of the deicing composition of the present invention. The deicing compositions of Examples 1-11 were prepared by mixing the components and stated percentages are percentages by weight. Example 12 refers to immersion corrosion tests of the deicing compositions of Examples 1-11. The result is presented in Table 1.

EXAMPLE 1 (COMPARATIVE)

| | |
|---|---|
| Potassium formate, % | 99.12 |
| Sodium metasilicate, % | 0.48 |
| Potassium phosphate, % | 0.40 |

EXAMPLE 2 (COMPARATIVE)

| | |
|---|---|
| Potassium formate, % | 97.2 |
| Sodium metasilicate, % | 2.5 |
| Potassium phosphate, % | 0.3 |

EXAMPLE 3 (COMPARATIVE)

| | |
|---|---|
| Potassium formate, % | 100.0 |

EXAMPLE 4

| | |
|---|---|
| Potassium formate, % | 99.85 |
| Sodium metasilicate, % | 0.12 |
| Hexanoic acid, % | 0.03 |

EXAMPLE 5

| | |
|---|---|
| Potassium formate, % | 99.84 |
| Sodium metasilicate, % | 0.12 |
| Octanoic acid, % | 0.04 |

EXAMPLE 6

| | |
|---|---|
| Sodium formate, % | 99.84 |
| Sodium metasilicate, % | 0.12 |
| Decanoic acid, % | 0.04 |

EXAMPLE 7

| | |
|---|---|
| Potassium formate, % | 99.91 |
| Sodium metasilicate, % | 0.05 |
| Octanoic acid, % | 0.04 |

EXAMPLE 8

| | |
|---|---|
| Potassium formate, % | 99.78 |
| Sodium metasilicate, % | 0.13 |
| Dodecanoic acid, % | 0.09 |

EXAMPLE 9

| | |
|---|---|
| Potassium formate, % | 99.81 |
| Sodium metasilicate, % | 0.13 |
| Decanoic acid, % | 0.06 |

EXAMPLE 10

| | |
|---|---|
| Sodium formate, % | 98.79 |
| Sodium metasilicate, % | 0.20 |
| Dodecanoic acid, % | 0.56 |
| Potassium phosphate, % | 0.32 |
| Sodium hydroxide | 0.13 |

EXAMPLE 11

| | |
|---|---|
| Sodium formate, % | 98.79 |
| Sodium metasilicate, % | 0.30 |
| 2-Ethylhexanoic acid, % | 2.60 |

-continued

| | |
|---|---|
| Potassium phosphate, % | 0.10 |
| Sodium hydroxide | 0.72 |

EXAMPLE 12

Immersion corrosion tests with solutions in water of the deicing compositions of Examples 1-11 were substantially performed according to ASTM F 483-98 and AMS 1431B except that the immersion times were substantially prolonged. Panels of dichromated magnesium AZ31B-H26 (Examples 1-2, 4-6 and 8-11) and cadmium plated steel (Examples 3 and 7) were immersed at a solution temperature of 38° C. for 24, 96, 120 and 240 hours. The weight changes of the dichromated magnesium alloy panels and the cadmium plated steel panels were recorded after said immersion times. The test result is given in Table 1 below and show that deicing compositions according to the present invention exhibit substantially improved corrosion inhibition.

TABLE 1

Weight change in mg/cm$^2$ during immersion

| | 24 hours | 96 hours | 120 hours | 240 hours |
|---|---|---|---|---|
| Example 1, 10% solution | −0.40 | | | |
| Example 2, 15% solution | −0.10 | | | |
| Example 3, 50% solution | −0.10 | −0.21 | | |
| Example 4, 50% solution | +0.06 | | +0.06 | |
| Example 5, 50% solution | −0.12 | | −0.24 | |
| Example 6, 50% solution | +0.05 | | +0.05 | |
| Example 7, 50% solution | −0.04 | −0.13 | | |
| Example 8, 50% solution | +0.06 | | | +0.03 |
| Example 9, 50% solution | +0.08 | | | +0.07 |
| Example 10, 15% solution | −0.08 | | | |
| Example 11, 10% solution | −0.05 | | | |

The invention claimed is:

1. A deicing composition which comprises 89-99.98% by weight of a alkali metal formate, 0.01-6% by weight of an alkali metal silicate and 0.01-5% by weight of a $C_4$-$C_{19}$ alkyl carboxylic acid, said weight percentages being calculated on dry substances.

2. A deicing composition according to claim 1 which is obtained by mixing 98-99.98% by weight of a alkali metal formate, 0.01-1% by weight of an alkali metal silicate and 0.01-1% by weight of a $C_4$-$C_{19}$ alkyl carboxylic acid, said weight percentages being calculated on dry substances.

3. A deicing composition according to claim 1 wherein said alkali metal formate is added in an amount of 99-99.98%, by weight.

4. A deicing composition according to claim 1 wherein said alkali metal silicate is added in an amount of 0.05-0.5% by weight.

5. A deicing composition according to claim 1 wherein said alkyl carboxylic acid is added in an amount of 0.01-0.5%, by weight.

6. A deicing composition according to claim 1 wherein said alkali metal formate is potassium or sodium formate.

7. A deicing composition according to claim 1 wherein said alkali metal silicate is an alkali metal metasilicate.

8. A deicing composition according to claim 7 wherein alkali metal metasilicate is potassium or sodium metasilicate.

9. A deicing composition according to claim 1 wherein said alkyl carboxylic acid is $C_6$-$C_{12}$ alkyl carboxylic acid.

10. A deicing composition according to claim 1 wherein alkyl carboxylic acid is selected from the group consisting of is valeric acid, capric acid, caprylic acid, caproic acid, decanoic acid, dodecanoic acid, hexanoic acid, 2-ethyl hexanoic acid and octanoic acid.

11. A deicing composition according to claim 1 wherein an alkali metal base, is added.

12. A deicing composition according to claim 11 wherein said alkali metal base is potassium or sodium hydroxide.

13. A deicing composition according to claim 11 wherein said alkali metal base is added in an amount equivalent to said alkyl carboxylic acid.

14. A deicing composition according to claim 1 further including an alkali metal phosphate.

15. A deicing composition according to claim 1 wherein alkali metal phosphate is added in an amount of 0.01-1% by weight, calculated on said alkali metal formate.

16. A deicing composition according to claim 15 wherein said alkali metal phosphate is potassium or sodium phosphate.

17. The deicing composition of claim 3 wherein said alkali metal formate is added in an amount of 99.4-99.94% by weight.

18. The deicing composition of claim 5 wherein said alkyl carboxylic acid is added in an amount of 0.01-0.1%, by weight.

19. The deicing composition of claim 11 wherein the alkali metal base is at least one selected from the group consisting of alkali metal hydroxide, alkoxide and carbonate.

20. A method of deicing, comprising applying a deicing composition according to claim 1, in areas in need of deicing and/or anti-icing.

21. A method of deicing, comprising applying a deicing composition according to claim 1, in deicing and/or anti-icing of airfields, airfield runways and taxiways.

22. A method of deicing, comprising applying a deicing composition according to claim 1, in deicing and/or anti-icing of streets, roads, cycle ways, footpaths, bridges, backyards, parking areas and sports grounds.

23. A method of deicing, comprising applying a deicing composition according to claim 1, as an aqueous solution comprising 5-60%, by weight of said composition.

24. The method of claim 23 wherein said aqueous solution comprise 20-40% by weight of said component.

* * * * *